March 26, 1968     H. O. SCHERENBERG     3,374,773

DIESEL ENGINE

Filed April 27, 1965     3 Sheets-Sheet 1

INVENTOR

HANS O. SCHERENBERG

BY *Dicke & Craig*

ATTORNEYS.

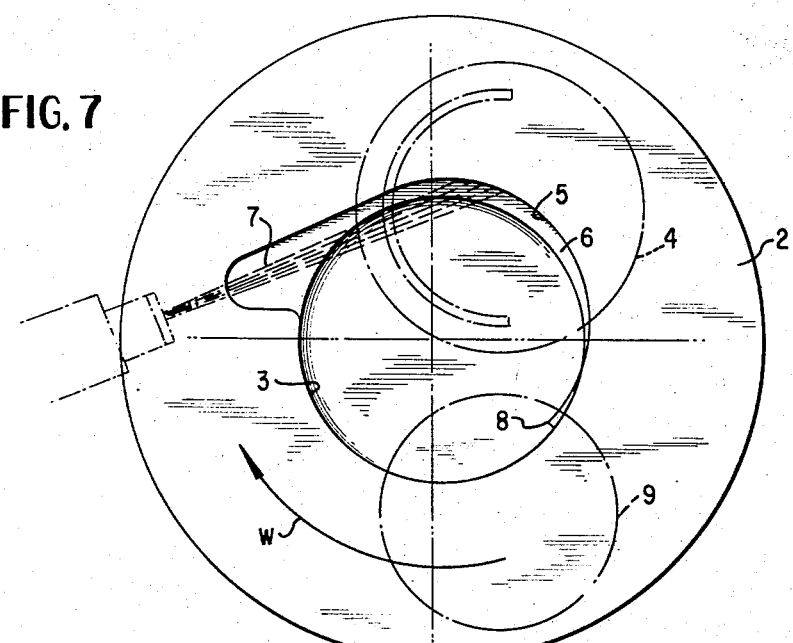

March 26, 1968 H. O. SCHERENBERG 3,374,773
DIESEL ENGINE
Filed April 27, 1965 3 Sheets-Sheet 3

INVENTOR
HANS O. SCHERENBERG
BY Dicke & Craig
ATTORNEYS.

United States Patent Office 3,374,773
Patented Mar. 26, 1968

3,374,773
DIESEL ENGINE
Hans O. Scherenberg, Stuttgart-Heumaden, Germany, assignor to Daimler-Benz Aktiengesellschaft, Stuttgart-Unterturkheim, Germany
Filed Apr. 27, 1965, Ser. No. 451,274
15 Claims. (Cl. 123—30)

ABSTRACT OF THE DISCLOSURE

The present disclosure relates to an improvement and to a further development of diesel engines, particularly four-cycle engines for motor vehicles, having an axially symmetrically shaped combustion chamber arranged in the piston and a nozzle arranged in the cylinder head obliquely, centrally or eccentrically to the center which injects the fuel in one or several compact jets against the combustion chamber wall in the same and/or opposite direction of an air vortex rotating about the combustion chamber axis. The fuel is caught on and held by one or more relatively wide shoulders in the central area of the combustion chamber walls. Preferably, a plurality of circumferential shoulders are provided, the decrease in width in the direction of the tangentially injected fuel and correspond in number to one or a multiple of the fuel jets. The shoulders may end circumferentially flush or in a splash off edge with respect to the combustion chamber wall.

---

The present invention essentially consists in that exactly at or approximately at the mean height of the combustion chamber one or several fuel catch or collecting shoulders are arranged which intersect the combustion chamber axis exactly or approximately perpendicularly. The fuel collecting shoulders are produced by means of surface recessed or set back from the combustion chamber wall, for example, by means of recesses or channels provided in the combustion chamber wall. Within the scope of the present invention, either only one single fuel catching or collecting shoulder may be provided or so many catching or collecting shoulders are preferably spaced over the entire combustion chamber circumference as correspond to the number of jets present during the injection of the fuel. Several such collecting shoulders may also lie one above the other.

The present invention aims at avoiding that fuel adhering in droplet form to the combustion chamber wall or spreading as liquid level flows downwardly along the combustion chamber wall and gives rise to a rich mixture within the lower regions of the combustion chamber which will lead to a smoky combustion.

Accordingly, it is an object of the present invention to provide a diesel engine which obviates, by extremely simple means, the aforementioned drawbacks encountered with the prior art constructions.

It is another object of the present invention to provide a diesel engine, especially a four-cycle diesel engine, which exhibits greatly improved performance characteristics.

A further object of the present invention resides in the provision of a diesel engine so constructed and arranged as to minimize the danger of smoky combustion thereof.

These and further objects, features, and advantages of the present invention will become more obvious from the following description when taken in connection with the accompanying drawing which shows for purposes of illustration only, several embodiments in accordance with the present invention, and wherein.

Figure 8:
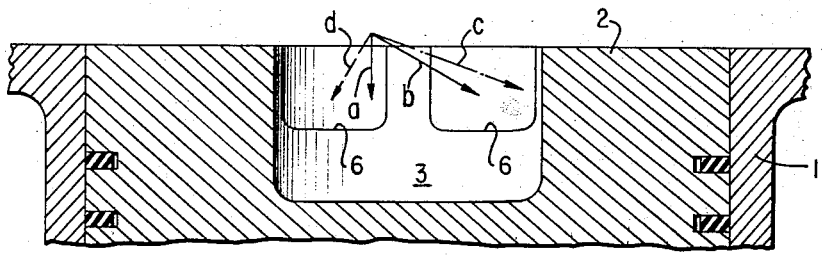
Figure 9:
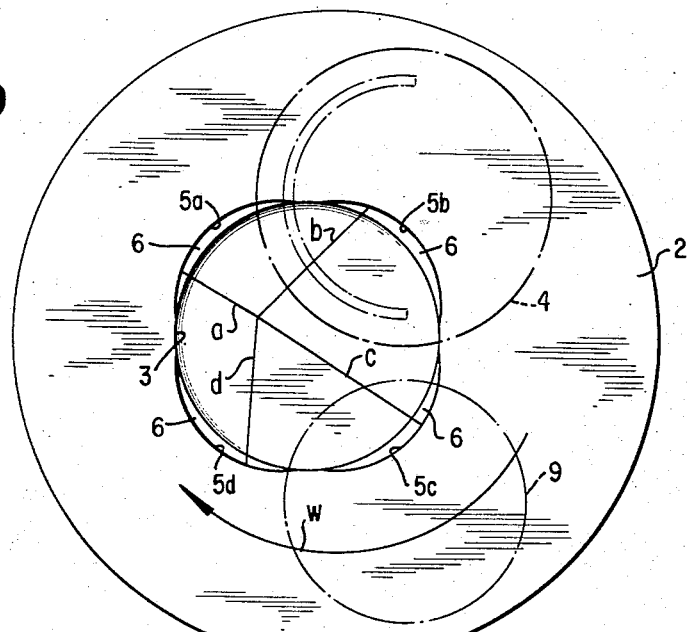

FIGURES 3, 4, 5, and 6, are partial longitudinal cross-sectional views through further modified embodiments of combustion chambers arranged in the piston in accordance with the present invention;

FIGURE 7 is a top plan view on a combustion chamber arranged in the piston in accordance with the present invention;

FIGURE 8 is a partial longitudinal cross-sectional view through a modified piston with a combustion chamber having a number of fuel catching or collecting surfaces in accordance with the present invention;

FIGURE 9 is a somewhat schematic top plan view on the piston of FIGURE 8; and

Figure 10:
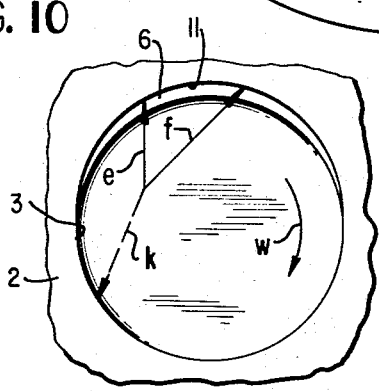
Figure 11:
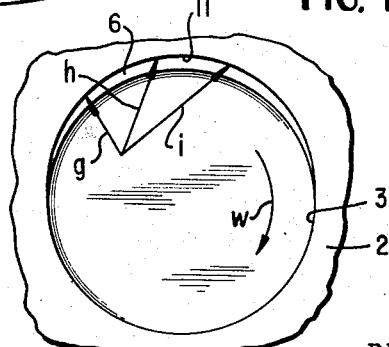

FIGURES 10 and 11 illustrate schematically and in plan view various injection spray patterns for the pistons according to FIGURES 1 to 9.

Referring now to the drawing wherein like reference numerals are used throughout the various views to designate like parts, in all exemplified embodiments (FIGURES 1 and 8), the cyinder of the internal combustion engine is designated by reference numeral 1 and the working piston, slidably arranged therein, by reference numeral 2 (FIGURES 1 to 9). The piston top is provided with a cylindrical combustion chamber 3 having a flat bottom portion and, for example, displaced by a small amount from the cylinder axis. Within this combustion chamber, an air vortex rotates during the time of fuel injection in the direction of arrow W (FIGURES 2, 7 and 9 to 11) which is produced by special means at the air inlet opening to the cylinder for example by means of a valve deflector 4 (FIGURES 2, 7 and 9), a spirally shaped inlet channel end or by means of correspondingly formed deflecting surfaces at the air inlet opening. The injection of the fuel is accomplished by an injection nozzle also displaced from the center of the cylinder cross section and arranged in the cylinder head at an inclination.

Figure 1:
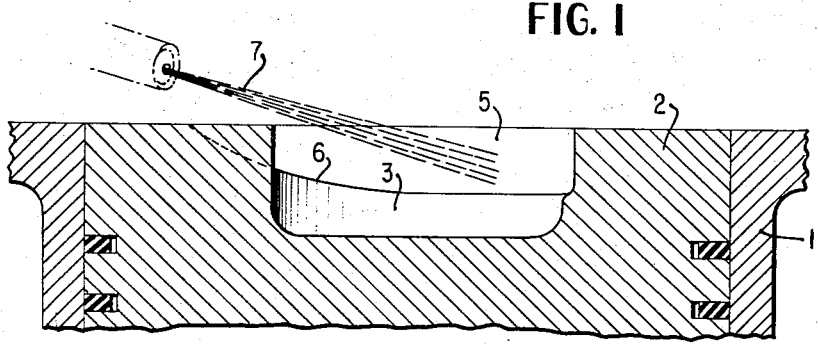
FIGURE 1 is a longitudinal cross-sectional view through the upper portion of an internal combustion engine piston in the upper dead-center position thereof at the moment of injection.
Figure 2:
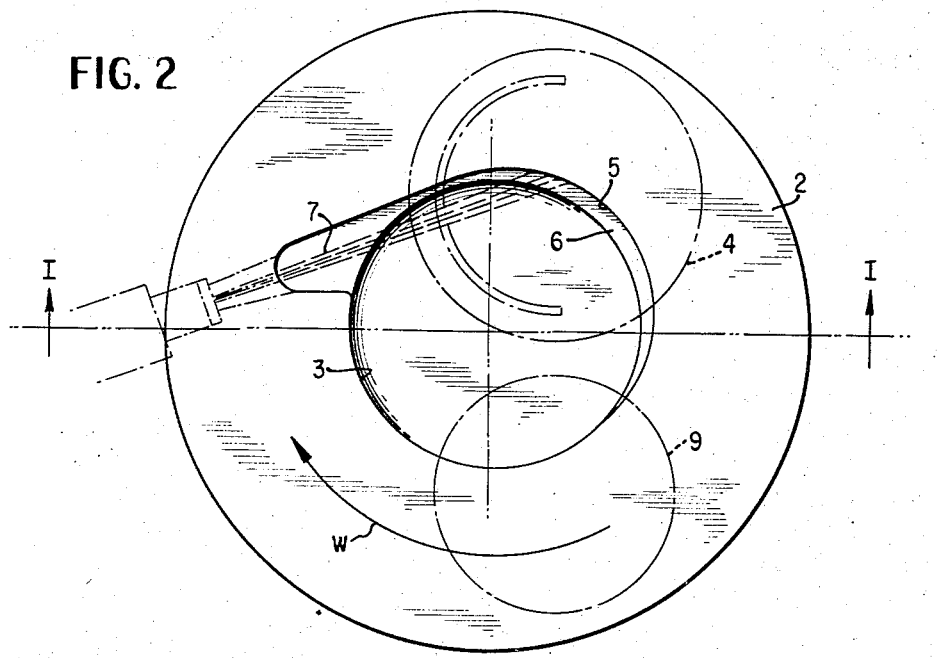
FIGURE 2 is a top plan view on the piston according to FIGURE 1.

In the embodiment according to FIGURES 1 and 2, the fuel injection is accomplished by a single, preferably as compact as possible a spray at as flat as possible an angle relative to the horizontal and approximately tangential to the cylindrical combustion chamber cross section, into a recess 5 in accordance with the present invention provided within the combustion chamber wall which recess 5, at about the mean height of the combustion chamber, forms a fuel catching or collecting shoulder 6 intersecting the axis of the combustion chamber approximately at a right angle. Furthermore, the injection takes place in such a manner that the fuel jet 7 impinges, relative to the direction of rotation of the air, above the shoulder 6 within the forward region against the boundary wall of the recess 5, which in the embodiment according to FIGURE 2, passes over at its rearward end in a stepless manner into the cylindrical combustion chamber wall or which according to the embodiment of FIGURE 7, terminates in a splash-off edge 8 protruding with respect to the combustion chamber wall. The exhaust valve is designated in FIGURES 2, 7 and 9 by reference numeral 9.

The mode of operation of the present invention is believed obvious from an inspection of FIGURES 1 and 2. The fuel jet which impinges on the recess wall 5 is absorbed and carried along by the vortex W as vapor which detaches itself from the recess wall 5. The vapor is thereby mixed with the air to form a combustible mixture. According to the present invention, any liquid fuel particles possibly flowing downwardly will be caught by shoulder 6 at a depth range of the combustion chamber in which there is little tendency for forming a rich mixture and smoky combustion and where the vaporized fuel is also caught by the vortex.

Figure 3:
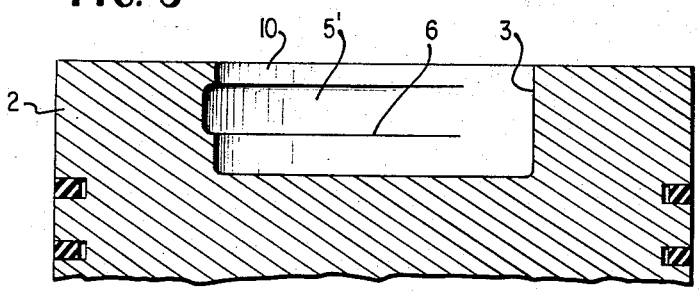

In the embodiment according to FIGURE 3, the rotating vortex W receives a better guiding in that in place of the recess 5 extending from the shoulder 6 upwardly to the piston top, that is, open on top, a channel 5' is provided at a distance from the piston top surface so that a marginal edge 10 remains as upper channel boundary at the overflow opening of the combustion chamber.

In the embodiments according to FIGURES 4 and 5, three channels are provided, one above the other, which form three shoulders 6, 6', and 6" that either lie in a vertical line or plane one above the other or, as viewed from the top downwardly, are staggered in the direction toward the combustion chamber bottom as is shown in FIGURE 4. The edges of the channels may, according to FIGURE 6, also be defined by edges diverging in the direction toward the channel end.

In the embodiment according to FIGURES 8 and 9, the fuel is injected in four compact jets a, b, c, and d. Accordingly, four recesses 5a, 5b, 5c, and 5d are provided in the cylindrical combustion chamber wall, each forming a fuel catching or collecting shoulder.

As shown in FIGURES 10 and 11, it is also possible to inject into the same recess or channel 11, several jets e and f or g, h, and i. In the embodiment according to FIGURE 10, the fuel jet e impinges against the recess wall 11 within the front region thereof and the fuel jet f within the center region thereof. In the embodiment according to FIGURE 11, the impingement points of jets g, h, and i are located within the front half of recess 11, disposed approximately equally spaced. As shown in FIGURE 10 in the dotted lines, one or a number of jets k may also be directed opposite to the air vortex W, and more particularly either again into a separate recess provided at the points of impingement or so close in front of the recess 11 directly against the combustion chamber wall 3 that any possibly draining-off liquid fuel particles are displaced by way of the catching or collecting shoulder of recess 11 by means of the vortex W and are blown along the same.

In place of a combustion chamber with a cylindrical cross section, any other suitable cross-sectional form may be chosen, for example, an upright or horizontal elongated form, a pear-shaped form, or a cross section which especially becomes wider in the downward direction or also a spherical cross section.

While I have shown and described several embodiments in accordance with the present invention, it is understood that the same is not limited thereto but is susceptible of numerous changes and modifications as known to persons skilled in the art and I therefore do not wish to be limited to the details shown and described herein but intend to cover all such changes and modifications as are encompassed by the scope of the appended claims.

I claim:
1. A diesel engine, especially four-cycle engine for motor vehicles, comprising:
cylinder means including cylinder head means,
piston means within said cylinder means provided with substantially rotationally symmetrical combustion chamber means,
means in said engine for producing an air vortex within said combustion chamber means about the axis thereof,
injection means for injecting at least one compact fuel jet against the combustion chamber wall,
and a cavity in said combustion chamber wall having at its bottom substantially radially extending shoulder means located within the area about half the height of said combustion chamber means for catching and holding substantially all of the fuel injected into said cavity, said cavity and shoulder means extending circumferentially for only a segment of the combustion chamber wall circumference.
2. An engine according to claim 1, wherein said shoulder means passes smoothly over in the direction of rotation of said air vortex into the main cross-sectional shape of the combustion chamber wall in a substantially stepless manner.
3. An engine according to claim 1, wherein said cavity terminates, in the direction of rotation of the air vortex, in a spray-off edge provided thereat in the combustion chamber wall.
4. A diesel engine according to claim 1, wherein said shoulder means include a plurality of axially spaced ledges.
5. A diesel engine according to claim 1, wherein said cavity increases in its axial dimension in the direction of said air vortex flow.
6. A diesel engine, expecially four-cycle engine for motor vehicles, comprising:
cylinder means including head means,
piston means within said cylinder means provided with substantially rotationally symmetrical combustion chamber means,
means in said engine for producing an air vortex within said combustion chamber means about the axis thereof,
injection means for injecting at least one compact fuel jet against the combustion chamber wall,
fuel catching shoulder means located within the area about half the height of said combustion chamber means and having a substantially radially extending relatively wide surface disposed in a plane intersecting the combustion chamber axis at an approximately right angle for receiving and holding a large portion of the fuel in said fuel jet, said shoulder means including a plurality of circumferentially spaced and aligned recess means in the wall of said combustion chamber means and said injection means injecting several jets into the same recess means.
7. An engine according to claim 6, wherein said several jets are injected evenly distributed into the forward section of the recess means as viewed in the direction of rotation of said air vortex.
8. A diesel engine, especially four-cycle engine for motor vehicles, comprising:
cylinder means including cylinder head means,
piston means within said cylinder means provided with substantially rotationally symmetrical combustion chamber means,
means in said engine for producing an air vortex within said combustion chamber means about the axis thereof,
injection means for injecting at least one compact fuel jet against the combustion chamber wall,
fuel catching shoulder means located within the area about half the height of said combustion chamber means and having a substantially radially extending relatively wide surface disposed in a plane intersecting the combustion chamber axis at an approximately right angle for receiving and holding a large portion of the fuel in said fuel jet, said shoulder means including a plurality of circumferentially spaced and aligned recess means in the wall of said combustion chamber means, said injection means injecting at least one jet into a first recess means disposed in front of the injection nozzle, as viewed in the direction of said air vortex, in a direction substantially opposite to said air vortex, and at least one jet into a second recess disposed rearwardly of the injection nozzle, as viewed in the direction of rotation of said air vortex, in substantially the same direction as said air vortex.
9. An engine according to claim 8, wherein said injection means injects several jets into said first recess means.
10. An engine according to claim 8, wherein said injection means injects several jets into said second recess means.

11. An engine according to claim 8, wherein said injection means injects several jets into said first and second recess means.

12. A diesel engine, especially four-cycle engine for motor vehicles, comprising:
cylinder means including cylinder head means,
piston means within said cylinder means provided with substantially rotationally symmetrical combustion chamber means,
means in said engine for producing an air vortex within said combustion chamber means about the axis thereof,
injection means for injecting at least one compact fuel jet against the combustion chamber wall,
fuel catching shoulder means located within the area about half the height of said combustion chamber means and having a substantially radially extending relatively wide surface disposed in a plane intersecting the combustion chamber axis at an approximately right angle for receiving and holding a large portion of the fuel in said fuel jet, said shoulder means extending circumferentially for only a portion of the combustion chamber wall circumference, said shoulder means including at least two circumferentially aligned and spaced separate shoulders; said injection means injecting at least one separate compact fuel jet onto each of said shoulders.

13. The diesel engine according to claim 12, wherein said injection means injects the fuel jet for one of said shoulders in the direction of the air vortex flow and injects the fuel jet for another of said shoulders counter to the direction of the air vortex flow.

14. The diesel engine according to claim 13, wherein each of said shoulders define the bottom wall of a corresponding one of a plurality of substantially identical circumferentially spaced and aligned recesses in the combustion chamber wall that extend upwardly from their respective shoulders at about mid-depth of said combustion chamber to open upwardly from the topmost portion of said piston means.

15. The diesel engine according to claim 14, wherein there are four of said shoulders and corresponding recesses; each of said recesses consisting essentially of a corresponding shoulder and one side wall terminating flush with the side wall of said combustion chamber at each circumferential end.

References Cited
UNITED STATES PATENTS

| | | | |
|---|---|---|---|
| 2,172,170 | 9/1939 | Megroot | 123—32 |
| 2,622,570 | 12/1952 | Nallinger | 123—32 |
| 2,762,348 | 9/1956 | Meurer | 123—32 |
| 2,837,067 | 6/1958 | Meurer | 123—32 |
| 2,921,566 | 1/1960 | Meurer | 123—32 |
| 2,942,591 | 6/1960 | Meurer | 123—32 |
| 2,942,592 | 6/1960 | Meurer | 123—32 |
| 2,975,773 | 3/1961 | Meurer | 123—32 |
| 2,995,121 | 8/1961 | Meurer | 123—32 |
| 3,083,700 | 4/1963 | Madak et al. | 123—32 |
| 3,107,658 | 10/1963 | Meurer | 123—32 |

LAURENCE M. GOODRIDGE, *Primary Examiner.*